A. W. WOODWARD.
TIRE CARRIER.
APPLICATION FILED JULY 9, 1919.

1,429,667.

Patented Sept. 19, 1922.
2 SHEETS—SHEET 1.

Witness:

Inventor:
Alva W. Woodward.
By G. L. Ely, Atty.

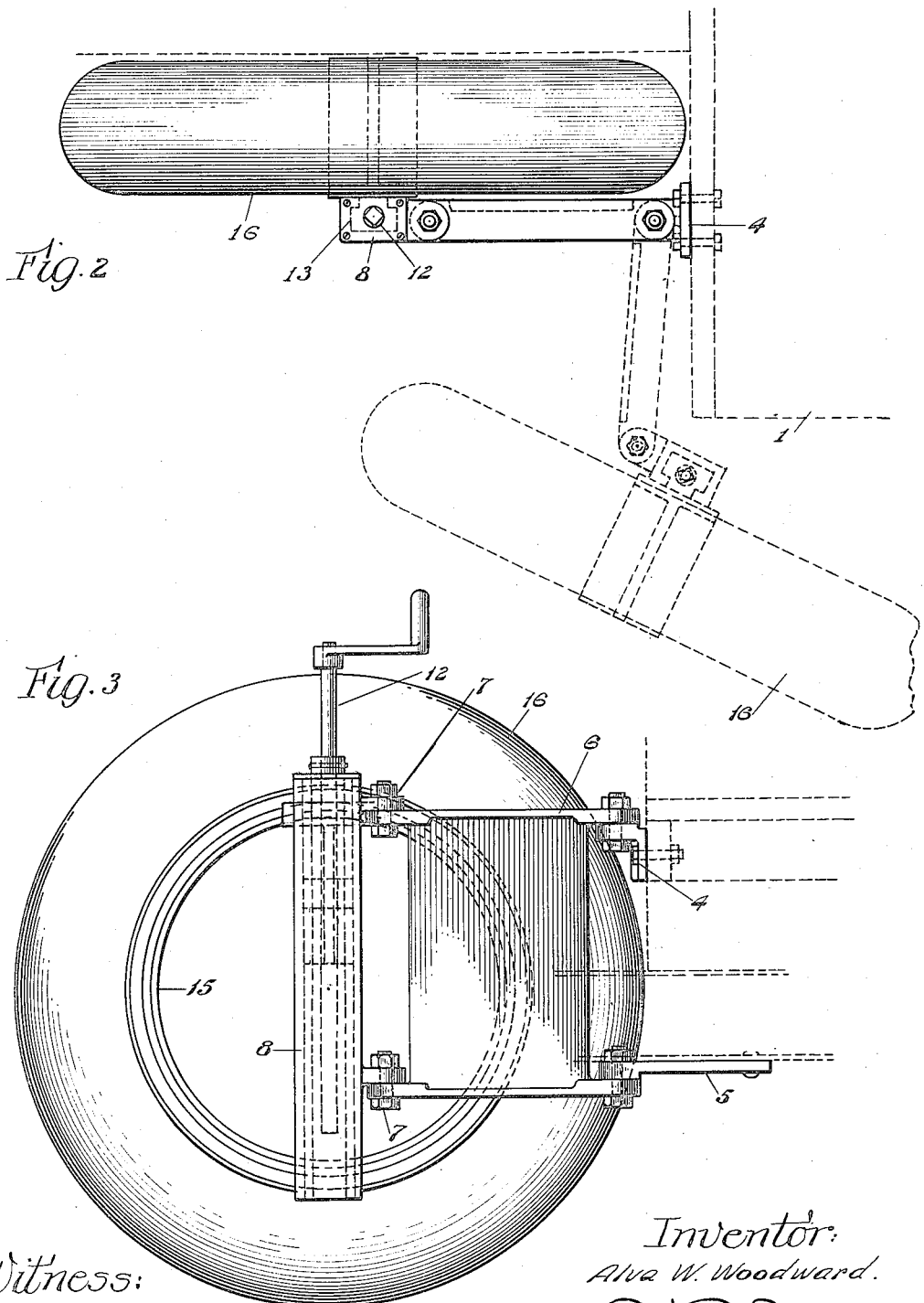

Patented Sept. 19, 1922.

1,429,667

UNITED STATES PATENT OFFICE.

ALVA. W. WOODWARD, OF AKRON, OHIO, ASSIGNOR, BY MESNE ASSIGNMENTS, TO LAWRENCE CARRIER CORPORATION, OF WILMINGTON, DELAWARE, A CORPORATION OF DELAWARE.

TIRE CARRIER.

Application filed July 9, 1919. Serial No. 309,592.

*To all whom it may concern:*

Be it known that I, ALVA W. WOODWARD, a citizen of the United States, residing at Akron, in the county of Summit, State of Ohio, have invented certain new and useful Improvements in Tire Carriers, of which the following is a specification.

This invention relates to a spare tire carrier for use on vehicles, particularly trucks, for carrying a spare or extra tire, and the object of the invention is to facilitate the handling of the spare tires, and relieve the operator of handling the heavy tire and rim. The invention is particularly designed for use in connection with heavy duty trucks which are supported on large pneumatic tires. The assembly of the spare tire and rim is quite heavy, sometimes weighing as much as four hundred pounds, and it is impossible for one man to lift the spare tire to and from the vehicle. My invention is intended to enable one operator to handle a spare tire of any size.

This and other objects will be apparent as the description proceeds and it will be understood that this particular form of apparatus is not essential, but may be varied without departing from the spirit of the invention.

In the drawings:

Fig. 2 is a plan view of the carrier, showing in dotted lines the position the carrier assumes when the tire is to be lowered on the ground.

Fig. 3 is a side elevation.

Figure 6:
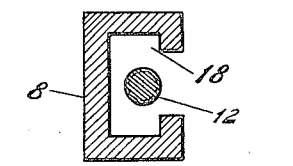
Figure 7:
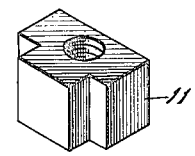
Figure 8:
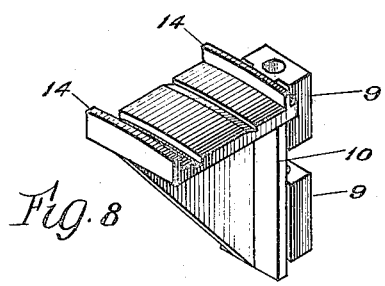

Figs. 6, 7, and 8 are small detail views.

In the drawings the truck or automobile body is indicated generally by the numeral 1, the engine being shown at 2, and the fender or running board at 3.

At any convenient point about the vehicle; here shown as in the front of a truck body near the running board, are mounted two brackets 4 and 5, to which is hinged a swinging double arm 6, the outer end of which carries a pair of alined pivot pins 7. On the pins 7 is a second arm or bracket 8, which is provided with a vertical guideway 18, in which is mounted for vertical reciprocation a pair of T-shaped lugs 9, which are spaced apart on the rear face of a bracket or seat 10. Between the lugs is mounted a T-shaped nut 11, which engages a screw 12 passing through a plate 13 on the upper side of the arm 8, the upper end of the screw being provided with a squared portion by which it may be turned.

The seat or bracket 10 is provided with a horizontal tire or rim supporting surface, the sides of which are flanged as at 14 to prevent shifting of the rim and the upper surface of which is shaped to a contour similar to the underside of the rim. The rim is indicated by the numeral 15 and the tire by the numeral 16.

Figure 1:
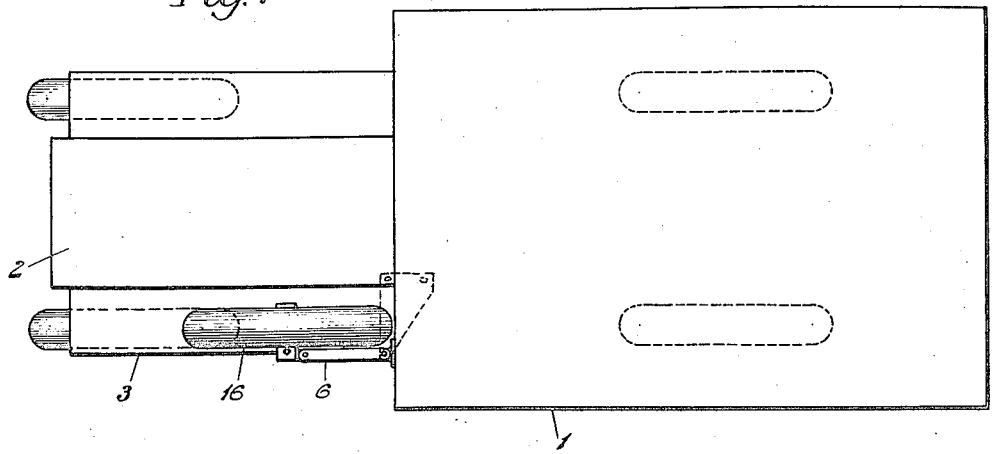
Fig. 1 is a plan view of a truck body showing a spare tire carrier in place.
Figure 4:
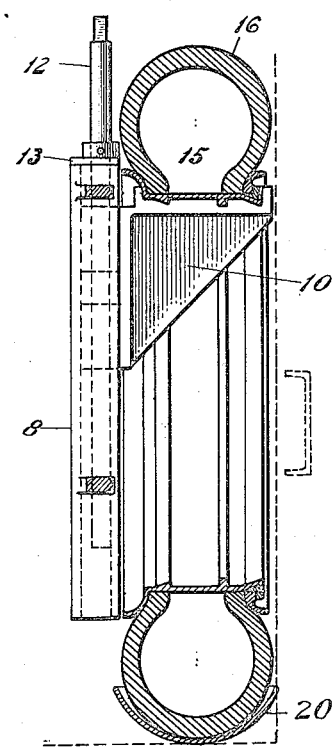
Fig. 4 is a vertical section through the tire.
Figure 5:
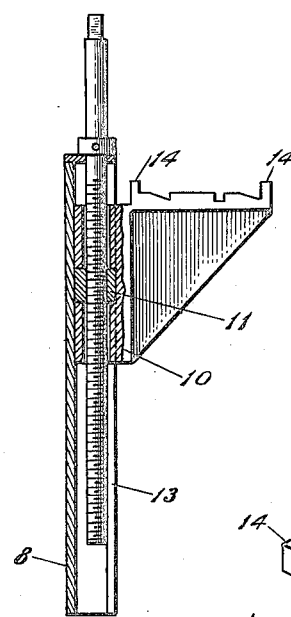
Fig. 5 is a vertical section through the carrier.

Any suitable means may be provided for holding the tire in place after it is located as shown in Fig. 1. It may be strapped to the shelf or bracket, or it may be lowered into a saddle or other tire receiving means 20 on the running board or at any other suitable location at which the tire is securely fastened. The height of the bracket 8 and the extent of travel of the nut 11 is sufficient to enable the tire to be lifted from the ground to a position slightly above the shelf 20, so that the apparatus may be used to lift the tire from the ground and lower it into the saddle or shelf 20.

It is believed that the operation will be understood from the description which has been given. When a spare tire is needed, its securing means are loosened and the seat or bracket 10 is raised by the jack or screw 12, to lift the tire from its place. The swinging arm 6 is then swung around to the position shown in dotted line in Fig. 2 and the tire is lowered on to the ground where it is rolled into position adjacent the wheel the movement of the support being continued after the tire reaches the ground to release it from the support. When a tire is to be carried as a spare, the operation is reversed.

While only a single seat or bracket is shown, it is obvious that the bracket may be widened to accommodate two or more tires, if desired. Other changes may be made, but it is to be understood that such changes as fall within the scope of this invention are intended to be covered herein.

It will be understood, for example, that where the tire is referred to in the appended claims the term is frequently meant to include the rim or mounting, as the tire and its rim or mounting virtually constitute a unitary structure when carried as a spare.

It will be observed that my carrier has the following advantageous characteristics; it raises the tire from the ground to traveling position on the vehicle and, conversely, it lowers directly to the ground the tire which it is desired to remove. These characteristics avoid the necessity of any bodily lifting of the tire. By "bodily lifting" I mean an act on the part of the operator of directly grasping the tire or spare wheel and then exerting the lifting action upon it without mechanical aid. My device may be regarded as an "antilift" structure, such lifting as is necessary being accomplished through the agency of mechanism other than the tire or spare wheel itself. In connection with the latter concept it will be noted that the mechanism is such as to multiply or intensify the efforts exerted by the operator. It will also be evident that this multiplying or intensifying action is operative throughout the entire range of movement of the tire from the ground to traveling position and vice versa. Another characteristic is that the mechanism is adapted to engage a tire when the latter is resting upon the ground in upright position—that is, the position which it naturally occupies in being rolled up to the apparatus. Conversely, the tire is delivered to the ground in an upright position ready to be rolled away. Another characteristic is that after the tire reaches the ground the seat on which it has been resting may be lowered still further so that the tire may clear the seat and be rolled away. Furthermore, it is quite possible to swing the carrier laterally and at the same time rotate the screw 12. This will produce an oblique or helical movement either laterally and upward or laterally and downward, as the case may be.

It will also be observed that in the illustrated embodiment of the invention, during the raising and lowering of the tire there is no reversal of top for bottom nor bottom for top—that is, no rotation of the tire about a horizontal axis. Also, the seat by which the tire is raised and lowered engages the upper portion of the inner edge of the tire mounting, and that the weight of the tire is thus supported during ascent and descent. The tire is at all times during ascent and descent suspended from the movable seat and remains approximately in a vertical plane.

I claim:

1. The combination, with a motor vehicle, of a tire carrier including means for supporting and carrying a tire thereon, and means including force-multiplying mechanism whereby the tire may be removed from the vehicle and placed upon the ground.

2. The combination, with a motor vehicle, of a seat for supporting the tire and its mounting, and operating means for the seat, said operating means having a pivotal connection to the vehicle and being capable of moving said seat in a direction having a vertical component, the vehicle and said operating means affording to the seat of the tire which is to be removed sufficient clearance to enable the operating means to lower said tire to the ground, said seat being adapted to hold said tire in upstanding position when about to come into contact with the ground.

3. The combination, with a motor vehicle, of a tire carrier mounted thereon and including a seat for the tire and its mounting, said seat having pivotal connection to the vehicle and being movable in a direction having a vertical component, the associated elements of the combination affording clearance sufficient to permit the seat to descend from traveling position to a point as close to the ground as the distance between the lowermost part of the tire and the point where the seat engages the tire mounting, and actuating means connected to said seat for raising and lowering it, said actuating means being adapted to be conveniently grasped by the operator for applying power to it.

4. The combination, with a motor vehicle, of a tire carrier one element of which is permanently attached to the vehicle as part of the equipment thereof, said carrier having a seat for the tire adapted to engage the tire mounting, the other elements of the combination affording sufficient clearance to permit the seat to descend as near the ground as the distance between the lowermost part of the tire and the point where the seat engages the tire mounting, whereby the tire mounting may be engaged when the tire is resting upon the ground, and force increasing means, other than the tire or its mounting, connected to said seat for elevating it to traveling position.

5. The combination, with a motor vehicle, of a tire carrier having a seat for supporting the tire, and operating means therefor capable of adjustment to permit the seat to engage the tire mounting when the tire is standing on the ground, said operating means being adapted to move the seat simultaneously upward and laterally to traveling position.

6. A combination, with a motor vehicle, of a tire carrier having a seat for supporting the tire, and manually operated means other than the tire itself whereby the seat may be operated, said manually operated means being capable of adjustment to permit the seat to engage the tire mounting when the tire is in upstanding position on the ground, and being adapted to multiply the force of the operator in lifting the tire and its mounting from the ground to traveling position on the vehicle.

7. The combination, with a motor vehicle, of a tire carrier mounted thereon and having a seat for supporting the tire while the vehicle is traveling, and seat supporting means adapted to lower the seat sufficiently to deliver the tire to upstanding position on the ground, and subsequently lower the seat still further to enable the seat to clear the tire and permit the latter to be removed without lifting.

8. The combination, with a motor vehicle, of a tire carrier mounted thereon, and having a seat for supporting the tire while the vehicle is traveling, force multiplying mechanism for moving the seat in a direction having a vertical component, whereby the seat may be moved toward and from traveling position, the seat having a pivotal connection to the vehicle, and a manipulating element adapted to be grasped by the operator and connected to the force multiplying mechanism for actuating it.

9. The combination, with a motor vehicle, of a tire carrier having a seat for supporting the tire, and supporting means for said seat capable of imparting to it a movement having a horizontal component to enable the tire to move away from the vehicle and a vertical component to enable the tire to be lowered to the ground from traveling position on the vehicle, said supporting means being unrestricted in its movement by the vehicle or other parts of the tire carrier prior to the delivery to the ground, in upstanding position, of the tire to be removed, said carrier being adapted to hold the tire at all times in approximately a vertical position.

10. The combination, with a motor vehicle, of an anti-lift tire carrier mounted thereon, and having a seat for supporting the tire while the vehicle is traveling, and seat supporting means including screw mechanism capable of lowering the seat sufficiently to deliver the tire to upstanding position on the ground, said screw mechanism being unrestricted in its movement whereby the seat may be lowered still further to enable it to disengage the tire when the latter is on the ground.

11. The combination, with a motor vehicle, of an anti-lift tire carrier mounted thereon, and having a seat for the tire mounting, force-multiplying mechanism for moving said seat, and an actuating element adapted to be grasped by the operator and connected to the force-multiplying element for actuating it, the seat being capable of a movement having simultaneously both a vertical and a horizontal component, the horizontal component increasing or decreasing the proximity of the tire as a whole from or toward the vehicle while the tire is being raised or lowered to or from traveling position.

12. A carrier for spare vehicle wheels and the like having a support upon which the wheel may rest when in traveling position, a seat for supporting the wheel when the same is being raised and lowered into and out of engagement with said stationary support and power multiplying mechanism composed of rigid parts and having a handle by which power may be applied by the operator, said power multiplying mechanism being adapted to operate said seat and capable of adjustment to permit the seat to engage the wheel when the latter is resting upon the ground in substantially upright position.

13. In combination with a vehicle, a swinging arm secured to the vehicle, a vertical screw shaft at the end of said arm, a bracket slidably mounted on the end of the arm and connected to the screw shaft, and rim engaging means on said bracket.

14. In combination with a motor vehicle, a tire carrier for a spare tire and its mounting, said carrier having a plurality of seats, one of which is movable relatively to the other for bringing the tire into and out of engagement with the latter, the carrier including operating means for the movable seat, and said operating means being adapted to lower the movable seat not only sufficiently to lower the tire to the ground, but to move downward out of contact with the tire mounting when the tire is resting upon the ground.

15. The combination, with a motor vehicle, of a tire carrier having a holder on the vehicle for supporting the tire, and movable means adapted to engage the tire mounting above the center of gravity thereof, for elevating the tire to said support, said movable means being capable of adjustment to permit engagement with the tire mounting when the tire is at rest upon the ground.

16. A tire carrier having a stationary holder for supporting the tire while traveling, movable means adapted to engage the tire mounting above the center of gravity thereof, for elevating the tire to said support, said movable means being adapted to descend sufficiently to engage the tire mounting when the tire is at rest upon the ground, and force multiplying mechanism adapted to be grasped by the operator for elevating said movable means.

17. The combination, with a motor vehicle, of a spare tire carrier mounted thereon and having means adapted to lower to the ground the tire which is to be removed, said means being adapted to hold the tire at all times in approximately a vertical position.

18. In combination with a vehicle, an anti-lift carrier for a spare tire and its mounting, said carrier being fastened to the vehicle and including a seat and a manually operated, force-multiplying power device other than the tire for raising and lowering the seat, the vehicle and said power device affording sufficient clearance to permit the seat to lower the tire to the ground, and the seat being adapted to engage the tire mounting above the center of gravity, whereby the tire and its mounting may hang suspended from the seat during the raising and lowering.

19. The combination, with a motor vehicle, of a tire carrier mounted thereon, and including a seat for the tire and its mounting, and operating means for said seat, said seat being adapted to move in a helical path for raising and lowering the tire.

20. The combination, with a motor vehicle, of a tire carrier mounted thereon, and including a seat for the tire and its mounting, and operating means for said seat, said seat being adapted to move in a helical path for raising and lowering the tire, said operating means being capable of adjustment to permit the seat to engage the tire mounting when the tire is resting upon the ground.

21. In a device of the class described, a carrier for transmitting the tire and its mounting, said carrier having means, other than the tire, by which the tire may be lowered to the ground in upstanding position, and said means including a seat for the tire which is non-rotatable about a horizontal axis, thereby preventing a reversal of the tire, top for bottom or bottom for top.

22. The combination, with a motor vehicle, of a tire carrier including means for supporting and carrying a tire thereon, and means including force-multiplying mechanism whereby the tire may be removed from the vehicle and placed upon the ground, the force-multiplying mechanism being composed of rigid elements.

23. A motor vehicle having an anti-lift tire carrier including a seat for supporting the tire mounting, in combination with force-multiplying, operating means other than the tire itself, capable of lowering the seat sufficiently to enable it to engage the tire mounting when the tire is resting on the ground in upstanding position, and capable of raising the seat sufficiently to move the tire to traveling position, the operating means being composed of rigid elements, and the seat being non-rotatable about a horizontal axis to thereby prevent a reversal of the tire during ascent and descent.

24. In a carrier and elevator for spare tires and their mountings, the combination, with the vehicle, of a movable seat for engaging the upper portion of the inner edge of the mounting for supporting it, and elevating mechanism for said seat composed of rigid parts, one of which is fastened to the vehicle, the elevating mechanism being capable of adjustment to permit the seat to engage the upper portion of the inner edge of the mounting when the tire is resting upon the ground in upright position and to raise the tire to traveling position on the vehicle.

25. In a carrier and elevator for spare tires and their mountings, the combination, with the vehicle, of a movable seat for engaging the upper portion of the inner edge of the mounting for supporting it, and elevating mechanism for said seat, the range of operation of the elevating mechanism being sufficient to lower the seat far enough to enable it to engage the upper portion of the inner edge of the mounting when the tire is resting upon the ground in upright position and the range being also sufficient to raise the tire to traveling position on the vehicle, the seat being non-rotatable about a horizontal axis whereby a reversal of the tire, top for bottom, is avoided during raising and lowering.

26. In combination with a motor vehicle, a tire carrier mounted thereon for transporting the tire and its mounting, said carrier including a movable support adapted to engage the tire mounting, and elevating mechanism other than the tire by which the support may be raised and lowered, the elevating mechanism being adapted to lower the support to a position to disengage the upper portion of the inner edge of the tire mounting when the tire is resting upon the ground.

27. In combination with a motor vehicle, a tire carrier mounted thereon for transporting the tire and its mounting, said carrier including a movable support adapted to engage the tire mounting, and elevating mechanism other than the tire by which the support may be raised and lowered, the elevating mechanism being composed of rigid elements and being capable of adjustment to permit the support to engage the upper portion of the inner edge of the tire mounting when the tire is resting upon the ground, the elevating mechanism being adapted to hold the movable support substantially upright at all times to thereby prevent rotation of the tire about a horizontal axis and the reversal thereof, top for bottom or bottom for top, during raising or lowering.

28. In combination with a motor vehicle, a tire carrier mounted thereon for transporting the tire and its mounting, said carrier having a seat adapted to engage the tire mounting and having upstanding projections for preventing shifting of the tire mounting transversely to the plane of the tire, and elevating mechanism, other than the tire, by which the seat may be raised and lowered, the elevating mechanism being adapted to lower the seat to within a shorter distance of the ground than the distance between the lowermost part of the tire and the point where the seat engages the tire mounting, the seat being thereby able to disengage the tire mounting after the tire has reached the ground in upstanding position.

29. In combination with a motor vehicle, a tire carrier having a stationary seat for transporting a spare tire and its mounting, and elevating means for raising and lowering the tire to and from said seat, said elevating means including a movable seat adapted to suspend the tire whereby the tire may at all times maintain an approximately upright position, and means for supporting said movable seat, said elevating means being pivoted at one end to the vehicle.

ALVA W. WOODWARD.